US009959192B1

(12) United States Patent
Burriesci et al.

(10) Patent No.: US 9,959,192 B1
(45) Date of Patent: May 1, 2018

(54) DEBUGGING INTERFACE FOR INSERTED ELEMENTS IN A RESOURCE

(71) Applicant: Google Inc., Mountain View, CA (US)

(72) Inventors: Matthew Strecker Burriesci, Half Moon Bay, CA (US); Willa Angel Chen, San Jose, CA (US); Sean Patrick Miller, Chesterbrook, PA (US); Nikita Beloglazov, San Mateo, CA (US); Nathan Peter Lucash, San Francisco, CA (US)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 14/854,956

(22) Filed: Sep. 15, 2015

(51) Int. Cl.
G06F 9/45 (2006.01)
G06F 11/36 (2006.01)
G06F 9/44 (2018.01)

(52) U.S. Cl.
CPC ........ *G06F 11/362* (2013.01); *G06F 11/3664* (2013.01); *G06F 8/38* (2013.01); *G06F 11/3656* (2013.01); *G06F 11/3668* (2013.01); *G06F 11/3684* (2013.01); *G06F 11/3696* (2013.01)

(58) Field of Classification Search
CPC .............. G06F 11/362; G06F 11/3656; G06F 11/3664; G06F 11/3668; G06F 11/3684; G06F 11/3696; G06F 8/38
See application file for complete search history.

(56) References Cited

U.S. PATENT DOCUMENTS

| 7,904,062 | B2 | 3/2011 | Ashkenazi et al. |
| 8,086,559 | B2 | 12/2011 | Anderson et al. |
| 8,112,672 | B2 | 2/2012 | Tsun |
| 8,533,141 | B2 | 9/2013 | Doig et al. |
| 8,635,542 | B2 | 1/2014 | Hickman |
| 8,904,277 | B2 | 12/2014 | Kroger et al. |
| 2003/0023485 | A1 | 1/2003 | Newsome |

(Continued)

OTHER PUBLICATIONS

Hui Wu et al., Weaving a Debugging Aspect into Domain-Specific Language Grammars, ACM, 2005, retrieved online on Aug. 23, 2017, pp. 1370-1374. Retrieved from the Internet: <URL: http://delivery.acm.org/10.1145/1070000/1066986/p1370-wu.pdf?>.*

(Continued)

*Primary Examiner* — Hanh T Bui
(74) *Attorney, Agent, or Firm* — Foley & Lardner LLP

(57) ABSTRACT

Systems and methods for providing a debugging interface for inserted elements in a resource are provided. One method includes detecting a trigger for a request to provide a debugging interface for a webpage, the webpage including a content interface configured to display third party content items. The method further includes transmitting the request for the debugging interface to a remote device, and receiving a script representing the debugging interface from the remote device. The method further includes inserting the debugging interface into the webpage by injecting the script into data of the webpage during loading of the webpage. The method further includes detecting a characteristic of at least one of the webpage, the content interface, or the remote device; and generating debugging information using the detected characteristic. The method further includes providing the debugging information in the debugging interface.

20 Claims, 8 Drawing Sheets

(56) References Cited

U.S. PATENT DOCUMENTS

| | | | |
|---|---|---|---|
| 2004/0117769 A1* | 6/2004 | Lauzon | G06F 11/3664 717/125 |
| 2009/0063262 A1 | 3/2009 | Mason | |
| 2009/0287572 A1 | 11/2009 | Whelan | |
| 2010/0095155 A1* | 4/2010 | Tsun | G06F 17/30011 714/32 |
| 2010/0106598 A1* | 4/2010 | Grimes | G06Q 30/02 705/14.53 |
| 2010/0198697 A1 | 8/2010 | Brown et al. | |
| 2010/0262498 A1 | 10/2010 | Nolet et al. | |
| 2010/0268603 A1 | 10/2010 | Nolet et al. | |
| 2010/0268609 A1 | 10/2010 | Nolet et al. | |
| 2011/0125594 A1 | 5/2011 | Brown et al. | |
| 2011/0231242 A1 | 9/2011 | Dilling et al. | |
| 2011/0231253 A1 | 9/2011 | Crawford et al. | |
| 2011/0231264 A1 | 9/2011 | Dilling et al. | |
| 2012/0144291 A1* | 6/2012 | Chang | G06F 17/30867 715/234 |
| 2013/0111330 A1 | 5/2013 | Staikos et al. | |
| 2013/0117129 A1 | 5/2013 | Brown et al. | |
| 2013/0144712 A1 | 6/2013 | Ruarte et al. | |
| 2015/0058114 A1 | 2/2015 | Yi | |
| 2015/0169600 A1* | 6/2015 | Yu | H04L 12/6418 715/234 |
| 2015/0363214 A1* | 12/2015 | Du | G06F 17/30705 703/23 |
| 2016/0364496 A1* | 12/2016 | Li | G06F 17/30899 |

OTHER PUBLICATIONS

Pei-Yu Chi and Yang Li, Weave: Scripting Cross-Device Wearable Interaction, ACM 2004, retrieved online on Aug. 23, 2017, pp. 1-10. Retrieved from the Internet: <URL: https://bid.berkeley.edu/files/papers/chi15_weave_chi.pdf>.*

Kapravelos et al., Hulk: Eliciting Malicious Behavior in Browser Extensions, 14 pages.

Stack Overflow, Can I Protect My Website From Client Side Ad Injection?, printed on Sep. 8, 2015 from Internet address: http://stackoverflow.com/questions/30680599/can-i-protect-my-website-from-client-side-ad . . . , 1 page.

Trak.In, MTNL to Hijack Your Browser and Insert Pop-Up Ads. Is It Legal?, printed on Sep. 8, 2015 from Internet address: http://trak.in/tags/business/2015/06/24/mtnl-hijack-pop-up-ads-browser-legal/ on Sep. 8, 2015, 6 pages.

* cited by examiner

DEBUGGING INTERFACE FOR INSERTED ELEMENTS IN A RESOURCE

BACKGROUND

In a networked environment, such as the Internet, first-party content providers can provide information for public presentation on resources, for example webpages, documents, applications, and/or other resources. Additional third-party content can also be provided by third-party content providers for presentation on the client device together with the information from the first-party content providers. A publisher may provide first-party content and third-party content on his or her resource. One challenge publishers face is how the third-party content is displayed on the resource.

When a publisher inserts a third-party content unit into the resource (e.g., a webpage), the publisher may reload the resource to see if (and how) the content unit appears. If the content unit does not appear, or appears in a way that is not desired, the publisher may start looking at code to see if an error is reported to the publisher's console. This may be reasonably time-consuming, and may require expertise that even some savvy publishers may not have. As a greater amount of content interface formats and/or methods of inserting the content are provided, a greater number and variety of errors can result in providing content in the resource.

SUMMARY

One illustrative implementation of the disclosure relates to a method. The method includes detecting, by a device comprising one or more processors, a trigger for a request to provide a debugging interface for a webpage, the webpage including a content interface configured to display a plurality of third party content items. The method further includes, in response to detecting the trigger, transmitting, by the one or more processors, the request for the debugging interface to a remote device. The method further includes receiving, by the one or more processors, a script representing the debugging interface from the remote device. The method further includes inserting, by the one or more processors, the debugging interface into the webpage by injecting the script received from the remote device into data of the webpage during loading of the webpage by the browser application, the debugging interface provided within the webpage displayed by the browser application. The method further includes detecting, by the one or more processors, a characteristic of at least one of the webpage, the content interface, or the device. The method further includes generating, by the one or the more processors, debugging information relating to the content interface using the detected characteristic, the debugging information including information relating to a problem preventing the browser application from displaying at least one of the third party content items in the content interface. The method further includes providing, by the one or more processors, the debugging information in the debugging interface inserted within the browser application.

Another implementation relates to a system including at least one computing device operably coupled to at least one memory. The at least one computing device is configured to detect a trigger for a request to provide a debugging interface for a webpage, the webpage including a content interface configured to display a plurality of third party content items. The at least one computing device is further configured to, in response to detecting the trigger, transmit the request for the debugging interface to a remote device. The at least one computing device is further configured to receive a script representing the debugging interface from the remote device. The at least one computing device is further configured to insert the debugging interface into the webpage by injecting the script received from the remote device into data of the webpage during loading of the webpage by the browser application, the debugging interface provided within the webpage displayed by the browser application. The at least one computing device is further configured to detect a characteristic of at least one of the webpage, the content interface, or the device. The at least one computing device is further configured to generate debugging information relating to the content interface using the detected characteristic, the debugging information including information relating to a problem preventing the browser application from displaying at least one of the third party content items in the content interface. The at least one computing device is further configured to provide the debugging information in the debugging interface inserted within the browser application.

Yet another implementation relates to one or more computer-readable storage media having instructions stored thereon that, when executed by one or more processors, cause the one or more processors to execute operations. The operations include detecting a trigger for a request to provide a debugging interface for a webpage, the webpage including a content interface configured to display a plurality of third party content items. The operations further include, in response to detecting the trigger, transmitting the request for the debugging interface to a remote device. The operations further include receiving a script representing the debugging interface from the remote device. The operations further include inserting the debugging interface into the webpage by injecting the script received from the remote device into data of the webpage during loading of the webpage by the browser application, the debugging interface provided within the webpage displayed by the browser application. The operations further include detecting a characteristic of at least one of the webpage, the content interface, or the device. The operations further include generating debugging information relating to the content interface using the detected characteristic, the debugging information including information relating to a problem preventing the browser application from displaying at least one of the third party content items in the content interface. The operations further include providing the debugging information in the debugging interface inserted within the browser application.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
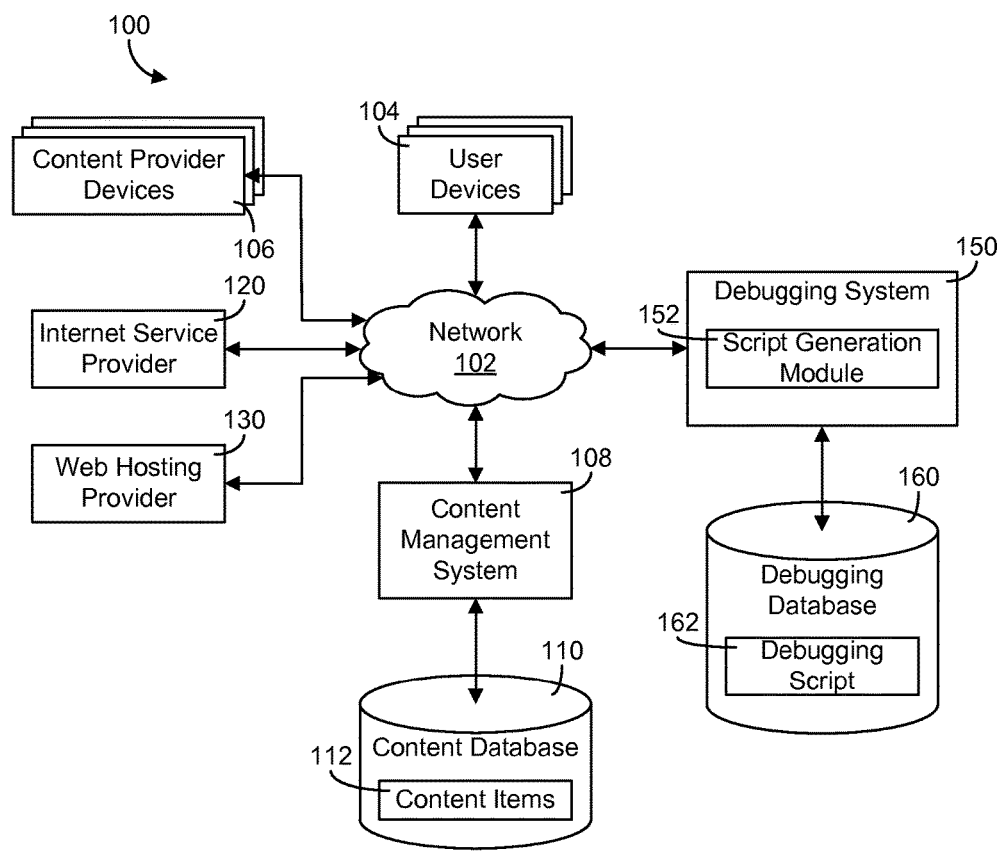
FIG. 1 is a block diagram of a debugging system and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods are provided for generating a debugging interface within a resource, such as a webpage. The debugging interface may be generated dynamically in response to a trigger. For example, in some implementations, a user may navigate using a browser application to a particular URL, and may append a predetermined tag or trigger string to the end of the URL. Code present in the browser application or webpage may recognize the predetermined trigger string and generate a request to a remote computing device configured to cause the remote device to provide data for use in generating the debugging interface. In some implementations, the data may be or include a script configured to install the debugging interface within the webpage (e.g., by installing the script within the webpage data, installing the debugging interface within a plugin/extension of the browser, etc.).

The debugging interface, browser application, and/or another portion of the user device of the user may receive characteristic information relating to the webpage, the content interface(s) within which third-party content items (e.g., advertisements or other content items) are presented within the webpage, the client device, and/or other characteristics. The characteristics may be used to generate debugging information indicating problems causing content items not to be displayed within the webpage. For example, in some implementations, one or more device characteristics may cause an item not to be displayed, such as a screen size, resolution, orientation, etc. In some implementations, characteristics of the webpage may cause the item not to be displayed, such as available space on portions of the page or the presence of one or more features on the page incompatible with a particular type of content item. In some implementations, characteristics of the content interface in which content items are presented may cause the item not to be displayed, such as an orientation of the content interface or the size of the content interface not being able to accommodate the content items. In some implementations, the client device may generate debugging information locally. In some implementations, the client device may additionally or alternatively transmit a request to the remote computing device including the characteristics, and the remote computing device may return at least a portion of the debugging information in response. The debugging information may be presented to the user within the debugging interface in the webpage.

For situations in which the systems discussed herein collect and/or utilize personal information about users, or may make use of personal information, the users may be provided with an opportunity to control whether programs or features that may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

Referring now to FIG. 1, and in brief overview, a block diagram of a debugging system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106. In some implementations, bids for content to be selected by content management system 108 may be provided to content management system 108 from content providers participating in an auction. In such implementations, content management system 108 may determine content to be published in one or more content interfaces of resources (e.g., webpages, applications, etc.) shown on user devices 104 based at least in part on the bids.

A debugging system 150 may be configured to receive an indication of a trigger for a debugging interface from user device 104 (or another system in environment 100). Debugging system 150 may analyze data from debugging database 160, user devices 104, content provider devices 106, and various other sources via network 102 and provide a script for injection on a webpage in response to the information. In some implementations, the script may be retrieved from memory or a database (e.g., debugging database 160) and provided to user device 104. Debugging database 160 may be configured to store one or more scripts for injection into code of a webpage. The scripts stored by debugging database 160 are configured to execute various modules or other functions to generate debugging information based on characteristic information determined at the user device. In other implementations, the script may be customized for a particular type of debugging feature, may be customized for a particular type of content interface or content item, or may be a general script applicable to any type of browser, device, or content interface.

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may include a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of a particular online newspaper.

Environment 100 further includes an internet service provider (ISP) 120 and web hosting provider 130. ISP 120 provides general services for accessing and using the Internet. In some implementations, information from the ISP 120 associated with the Internet connection used by user device 104 to access the webpage may be used for debugging purposes as described below. Web hosting provider 130 hosts webpages that may be accessed by user device 104. In some implementations, information from web hosting provider 130 may be used for debugging purposes as described below.

In some implementations, a publisher may access his or her resource (e.g., website) on a user device 104. One or more content items, selected by content management system 108 as described above, may be provided for display on the webpage. Using user device 104, a publisher may configure his or her webpage to display the one or more content items on the webpage. In various implementations, the publisher may designate one or more content interfaces or slots on the webpage in which content items may be displayed, may designate any restrictions on the types of content items displayed in the content interfaces (e.g., by content, by size, by format, etc.), may designate when content items are to be displayed, may designate one or more groups of users to which to present the content items (e.g., based on a device type of the user device), and/or may designate any other options related to the presentation of content items.

In some implementations, a publisher may trigger a debugging feature for the webpage and the content items. For example, after placing a content item in a content interface, or adjusting or creating one or more settings for displaying content items on the webpage, the publisher may trigger a debugging feature that provides information relating to the display of the content items on the webpage. User device 104 may inject a script received from debugging system 150 to cause a debugging interface to display on the webpage. Debugging system 150 may generally be configured to receive a request for a debugging feature from user device 104 and to provide a script and/or other information that can be used by user device 104 to present the debugging information. In some implementations, the debugging information may generally include an indication of whether a content item can display properly on the webpage based on the settings of the content items, the webpage, and/or the user device used to access the webpage. In some implementations, the debugging information may include data indicating why a content item cannot be displayed properly on the webpage. For example, the debugging information may include whether a content item is compatible with one or more settings (e.g., if the content item is not configured for display on mobile devices, and the publisher is attempting to insert the content item for display on mobile devices). As another example, the debugging information may include display settings for the content interfaces (e.g., the size of the content interface, if the interface is video-enabled, etc.) and an indication of whether the settings are compatible with the content item. The debugging information may further include suggestions to the publisher. Suggestions may include, for example, one or more content interfaces in which content items can be displayed properly, one or more settings that may be preventing certain content items from displaying properly, and the like.

Debugging system 150 may analyze data from debugging database 160, user devices 104, content provider devices 106, and various other sources via network 102 and provide a script for injection on a webpage in response to the information. Debugging system 150 may include one or more processors (e.g., any general purpose or special purpose processor), and may include and/or be operably coupled to one or more memories (e.g., any computer-readable storage media, such as a magnetic storage, optical storage, flash storage, RAM, etc.). In various implementations, debugging system 150 may be implemented as a separate system or may be integrated with another system within environment 100 (e.g., content management system 108).

Debugging system 150 may include one or more modules (e.g., implemented as computer-readable instructions executable by a processor) configured to perform various functions of debugging system 150. Debugging system 150 includes a script generation module 152. Script generation module 152 may be configured, upon receiving a request for a debugging interface from a user device 104, to provide a script to be injected into the code of the webpage. In some implementations, script generation module 152 may retrieve a debugging script 162 and other information from debugging database 160 to send to user device 104. In some implementations, script generation module 152 may use information from debugging database 160 and received from user devices 104 to determine a script to retrieve (or a script to modify or generate) for injection. The interface generated using the script displays debugging information based on the characteristics determined at user device 104. For example, user device 104 may detect one or more characteristics of the webpage or content items, and the script may be used to relay information about how the characteristics impact the content items.

In some implementations, Javascript may be used to implement the script in the webpage. In other implementations, any type of script or programming may be used to generate the script to be inserted into the webpage to cause a debugging interface to display.

The script generated by script generation module 152 may include various modules for executing the debugging features described herein. For example, referring also to FIG. 2, a script 203 may generally include a debugging trigger module 204, characteristic detection module 206, debugging information module 208, and update module 212. Modules 204, 206, 208, and 212 are generally configured to provide features relating to a debugging interface for display on user device 104. Modules 204, 206, 208, and 212 may be provided to user device 104 as part of debugging script 203. In some implementations, part or all of the functions of modules 204, 206, 208, and/or 212 may be implemented on user device 104. For instance, modules 204, 206, 208, 210, and/or 212 may be provided to user device 104 as part of debugging script 203, and one or more functions of those modules may be implemented on user device 104 after injection of debugging script 203.

In the implementations of the present disclosure, debugging script information is shown stored in a debugging database 150. In various other implementations, a debugging script and other debugging information may be retrieved from any source or combination of sources. For example, debugging system 150 may retrieve the debugging script and other information over network 102 from any source. Further, debugging information may be stored in any format within debugging database 160 or any other data storage device. Debugging database 160 is provided as an example data storage by way of example only.

Figure 2:
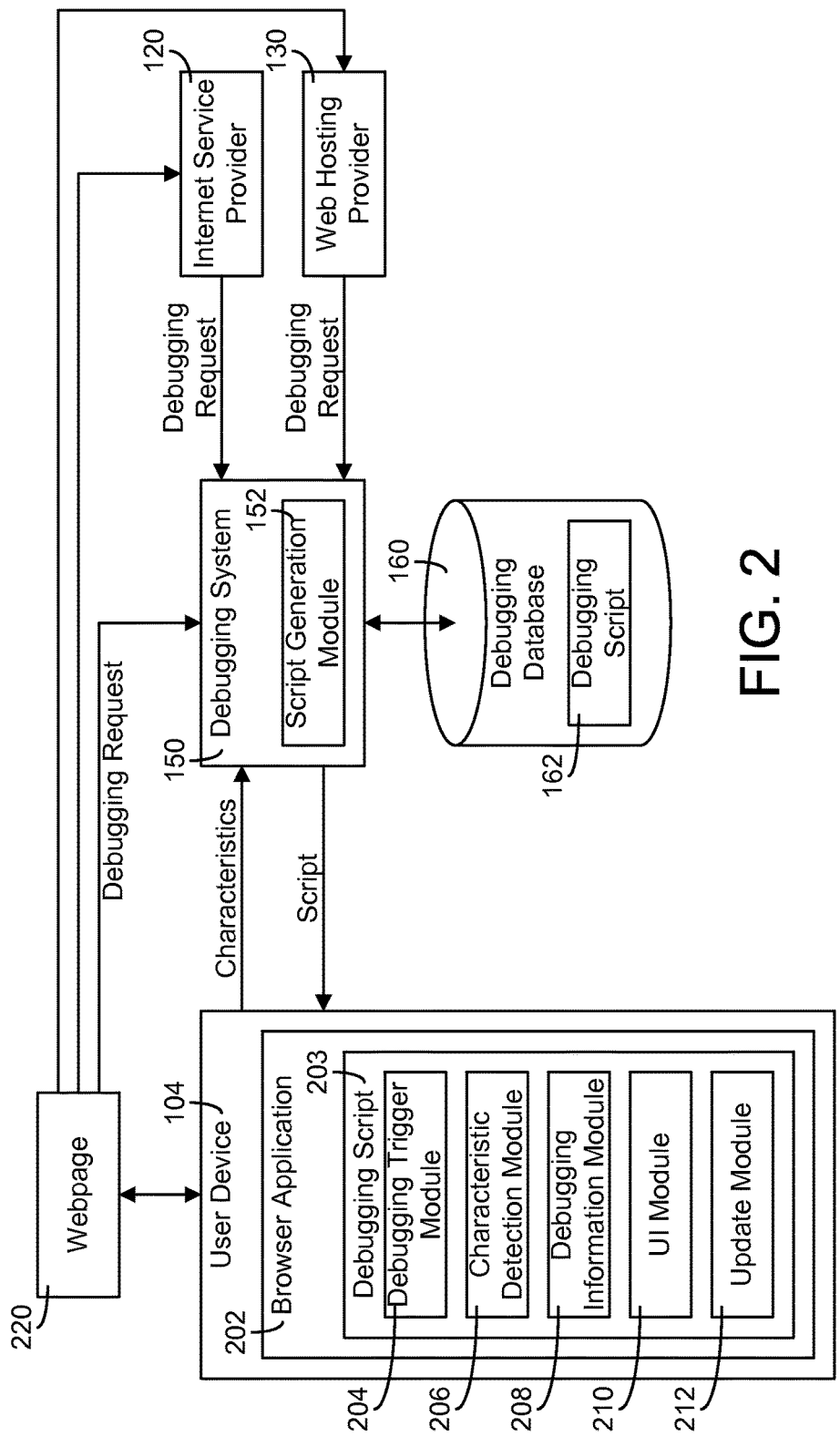
FIG. 2 is a detailed block diagram of the environment of FIG. 1 detailing generating a debugging interface at the user device according to an illustrative implementation.

FIG. 2 is a detailed block diagram of the environment of FIG. 1 according to an illustrative implementation. User device 104 is shown to include a browser application 202 generally configured to display a webpage 220 on user device 104.

Debugging system 150 is configured to provide a script 203 to user device 104 for displaying a debugging interface on user device 104. Script 203 may include one or more modules (e.g., implemented as computer-readable instructions executable by a processor) configured to perform various functions relating to the display of webpages and debugging information.

In some implementations, a debugging trigger module 204 may be provided. Debugging trigger module 204 may receive an indication related to a request for a debugging feature from a user of user device 104 via webpage 220. In some implementations, debugging trigger module may be implemented as a code portion within the code of webpage 220 and executed by the browser after parsing the webpage data. In some implementations, the publisher may trigger the request. For example, the publisher may append a string or hash to a URL for his or her website entered into the browser. In some implementations, code in the webpage, executed by the browser, may detect the string. For instance, tags associated with one or more elements in the code of the webpage, such as tags associated with content interface elements, portions of scripts embedded in the webpage, etc., may be configured to detect the string. In response, user device 104 may make a call to debugging system 150 requesting transmission of debugging script 162 to user device 104 for injection into the webpage data. Examples of strings may include "#ia_debug" or "#anchor_debug" appended to the end of a URL (i.e., www.example.com/#ia_debug). The string may include any identifier or instructions that indicate any particular debugging feature that the publisher wishes to trigger, or the string may be a general term that triggers a general debugging process for the entire webpage. For example, for the string "#anchor_debug", the debugging interface may be configured to specifically check content interfaces which are designated to display "anchor" content items (e.g., content items configured to display only on the bottom of a webpage). As another example, "#debug" may refer to a general check of all content interfaces on a webpage.

In some implementations, when the publisher appends a string to the URL, debugging system 150 may be configured to authenticate the publisher and/or user device. In some implementations, an identifier may be installed on the device of the publisher after authentication of the publisher, and the identifier may be transmitted to debugging system 150. Debugging system 150 may verify the publisher has permission to debug the webpage based on the identifier. in some implementations, debugging system 150 may prompt the user device for information for authentication (e.g., a login or other user input).

In other implementations, the debugging process may be triggered in other ways. For example, the publisher or a web hosting provider 130 may subscribe to a service for automatic debugging. Instead of waiting for a trigger from a publisher, the debugging process may be triggered when a publisher makes a change (e.g., change settings, place a new content item in the webpage, etc.), causing debugging information to be automatically provided via the debugging interface. As another example, the publisher may subscribe to a service for automatic content item insertion, which may allow debugging system 150 (or another system) to provide content item suggestions and website setting suggestions. In such a case, the debugging process may be triggered upon a publisher or other user signing in to the service or loading the webpage.

In some implementations, web hosting provider 130 may trigger the debugging process. For example, web hosting provider 130 may provide a link or other selectable option to a publisher via a configuration page or other page accessible to the publisher. The publisher may then select the link or other selectable option to trigger the debugging interface, instead of typing a URL with an appended string. As another example, web hosting provider 130 may automatically trigger the debugging process upon a publisher visiting the configuration page or other page. Web hosting provider 130 may be configured to provide the option for the debugging interface to any number of publishers, and may be configured to allow or restrict usage of the debugging interface in any way. In some implementations, information relating to web hosting provider 130 may also be used in the debugging process. For example, some content items may not display properly because of settings specified by web hosting provider 130 for all webpages that the provider hosts (e.g., rejecting content items of a specific type or subject, rejecting content items of a specific media type, etc.).

In some implementations, ISP 120 may trigger the debugging process. Similar to web hosting provider 130, ISP 120 may trigger activation of the debugging interface in response to a publisher action (e.g., the publisher using the ISP as a service, accessing his or her webpage). ISP 120 may be configured to automatically trigger the debugging process or to prompt the publisher with an option to trigger the debugging process (without using a string appended to a URL as described above). Additionally, in some implementations, information relating to ISP 120 may also be used in the debugging process. For example, some content items may not display properly because of settings specified by ISP 120 for webpages accessed through the ISP.

Characteristics may be detected that are used in the debugging process. Script 203 is shown to include a characteristic detection module 206 configured to receive information from user device 104 and to detect one or more characteristics of the webpage, user device, and/or content items. The characteristics are used to determine if a content item is displaying properly on the webpage, or why a content item is not displaying properly.

Characteristic information may include, for example, tag information. The webpage may include a plurality of tags, each tag relating to a particular item or object on the webpage. For example, a tag may relate to a title, image, content interface, menu, or any other object to be displayed on the webpage. In some implementations, the tag may include a short description and/or other identifying information relating to the item. For example, if the tag is for a content item, the tag may include information as to the settings required to display the content item on the webpage. The tag may additionally or alternatively include code relating to the tag. In some implementations, the publisher may choose or create tags for the items on the webpage, or the tags may be set in any other way. In some implementations, when the string is appended to a URL by a publisher, the code of each tag may be configured to detect the usage of the string. If the string relates to the tag, then the item the tag is associated with is identified as being relevant to the debugging process.

Characteristic information may include, for example, the type of user device 104 (e.g., mobile device, desktop, tablet, etc.). Different devices may have different settings and capabilities for displaying various content items (i.e., some content items may not be configured for display on a mobile device, or may be configured for display only on a mobile device). Characteristic information for user device 104 may include, for example, the model of the device, a manufacturer of the device, display characteristics (e.g., the type of display, the screen resolution, if the screen is a touchscreen, etc.), or other information relating to the operation of the device. Characteristic detection module 206 may determine if a particular content interface, or content item placed within the content interface, is compatible with user device 104.

Characteristic information may further include browser information. Browser information generally relates to the application on user device 104 configured to display the webpage and content items. Different browsers may have different levels of compatibility with various content items.

Characteristic information may further include orientation information. Orientation information generally relates to the display of the webpage on the screen of user device 104. For example, the webpage may be oriented in a portrait view or landscape view on user device 104. Some content items may be configurable for display only on one of a portrait view or a landscape view. Characteristic information may be used to determine if the content item is compatible with the orientation of the webpage.

Some content interfaces may be interactive. For example, some content interfaces may be configured to play back video or audio, either automatically or only after a user input (e.g., a click). As another example, some content interfaces may expand, contract, or otherwise change display when interacted upon (e.g., clicked on, or scrolled over). Characteristic information may include such information, and may be used to determine if the browser can properly display content items within the content interface (e.g., some browsers might not be configured for video or audio playback).

Some content items may include a link to other webpages or other resources. Characteristic information may include if the content item links in the content interface are compatible with the webpage (e.g., if a user is allowed to click on a content item to be taken to another webpage). In some implementations, the amount of interaction allowed with a content interface may vary.

Characteristic information may further include one or more links present on the webpage. The webpage may generally include one or more links that a user may interact with to access another webpage. Characteristic information may include whether content items interfere with the use or interaction with the one or more links.

Characteristic information may further include user device identification information. In some implementations, content items may be chosen for display on a webpage based on the user viewing the webpage (e.g., by providing content items more likely to be relevant to the interests of the user). Characteristic information may be used to determine if the content item is eligible for display for a particular user device or set of user devices, why a content item is eligible or not eligible for display for a particular user device, and so forth.

Characteristic information may further include client-side settings. Settings on the user device for the browser may prevent content items from displaying properly. For example, the zoom on the webpage may prevent the content item from displaying properly (e.g., zoomed in too much or zoomed out too much). Characteristic information may include the various browser settings that are enabled for the particular user.

In some implementations, characteristic information may include information from other sources, which may be received at characteristic detection module 206. For example, characteristic information may include one or more metrics related to a content item or content items displayed within a content interface. For example, a content item might not display in a content interface if the CPM of the content item is lower than a threshold. Characteristic detection module 206 may receive characteristic information that relates to content items which indicate when a content item might not appear because of one or more content item metrics.

Script 203 is shown to include a debugging information module 208. After the determination of one or more characteristics, debugging information is generated at debugging information module 208 (e.g., using the characteristics and/or information provided by debugging system 150). The debugging information may generally include information relating to a problem preventing the display of one or more content items in the content interface. In various implementations, the problem may relate to one or more settings preventing browser application 202 from displaying a content item properly, one or more website properties preventing the content item from loading on the webpage, one or more user device properties, etc. The debugging information is displayed on the debugging interface on user device 104, using script 203 to format the information for display.

Script 203 is shown to include a user interface (UI) module 210. UI module 210 receives the script from debugging module 150 and debugging information from debugging information module 208. UI module 210 is configured to inject the script into the code of the webpage to generate a debugging interface, and to display the debugging information in the interface. In some implementations, browser application 202 and/or user device 104 may include a general UI module that may be configured to display the interface, or assist UI module 210 in displaying the interface.

UI module 210 may be configured to display the debugging interface in one or more designated locations. For example, the debugging interface may be displayed in a particular location (e.g., the top of the webpage), and all other items displayed in the webpage are moved downwards. In some implementations, items may be moved up, left, or right to make room for the debugging interface. In some implementations, the debugging interface may be overlaid over one or more items on the webpage. In some implementations, the debugging interface may be placed on or near a content interface relating to a particular content item. For example, if a content item is not properly displaying on the webpage, the debugging interface is generated near the content item.

UI module 210 receives the script from the debugging system and injects the script into the code of the webpage. In some implementations, the script is injected into the code based on various tag information. If a tag was identified as being relevant to the debugging process when the debugging process was triggered, an appropriate spot in the code to inject the script is determined which will cause the debugging interface to display near the object associated with the tag. In other implementations, the debugging interface may be displayed within the webpage at any location (e.g., the top of the webpage) where general debugging information can be displayed. For example, the debugging interface may be placed at the top of the webpage. UI module 210 is configured to inject the script instead of providing the webpage with a plug-in or other software component that adds a specific new feature to the webpage (i.e., the debugging interface is displayed as part of the webpage).

The debugging interface may include various controls to allow for user interaction. For example, the debugging interface may include a "next" button. Upon clicking the button, the publisher may view one or more locations in which content items are not displaying properly or there are other errors. Further, upon clicking the button, the publisher may view one or more content interfaces eligible for displaying a content item. The debugging interface may include multiple interfaces on the webpage, each interface corresponding with a content interface. The debugging interface may include text and images illustrating one or more errors.

In some implementations, characteristic information may be generated at user device 104 and transmitted to a remote device (e.g., debugging system 150 or another system). The remote device may then be configured to generate debugging information from the characteristic information. In other words, the activities of characteristic detection module 206 may be carried out locally or remotely, or partially locally and partially remotely, from script 203.

Script 203 is shown to include an update module 212. The debugging interface may be updated in real-time or near real-time as the publisher is making updates to the website. For example, after providing a debugging interface, update module 212 may detect a change on the webpage. The change may relate to a changed content interface setting, an interaction (e.g., a click) on the debugging interface, or a changed webpage setting. Update module 212 may trigger characteristic detection module 206 and debugging information module 208 to generate new debugging information for display on the debugging interface. For example, the change may result in the content item now displaying properly, or may result in a new error being generated, and the information displayed in the debugging interface may be updated to reflect the change.

In the implementations of FIGS. 1-2, various modules are provided within script 203 for carrying out many of the debugging features of the present disclosure In other implementations, some or all of the various modules may be implemented within user device 104, or may not be provided to user device 104 (i.e., the process of determining debugging information occurs entirely at debugging system 150 and is then provided for display on user device 104). It should be understood that the location of the modules as described herein is not limiting.

Figure 3:
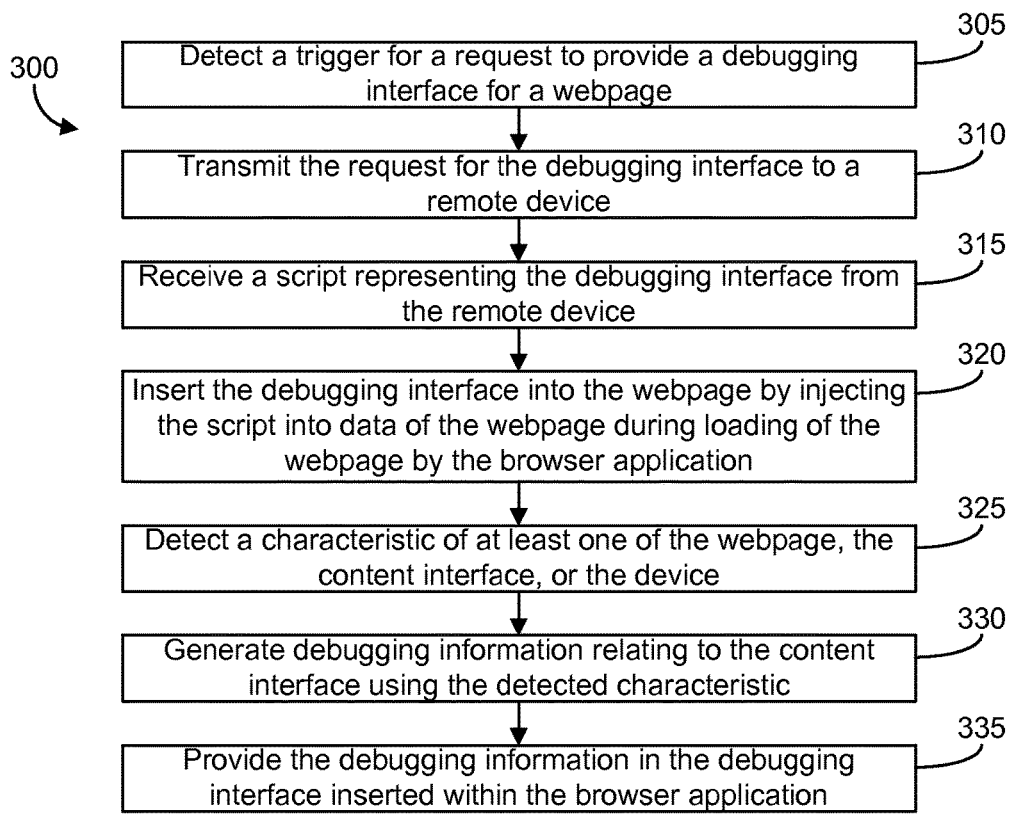
FIG. 3 is a flow diagram of a process for generating a debugging interface within a webpage according to an illustrative implementation.

Referring now to FIG. 3, a flow diagram of a process 300 for generating a debugging interface within a website is shown according to an illustrative implementation. Process 300 may be executed by, for example, user device 104 and/or debugging system 150 as described with reference to FIGS. 1-2. In some implementations, process 300 may be executed by a user device of a publisher of a webpage. The webpage may generally include one or more content interfaces or slots (generated by browser interface 202) configured to display a plurality of first-party content and third-party content (e.g., content items). The publisher may be configuring his or her webpage, inserting content interfaced into the webpage and/or inserting types of content items into one or more eligible content interfaces. A debugging interface may be generated within the webpage configured to provide information to the publisher related to the display of the content items. For example, the debugging interface may indicate when a content item cannot be displayed properly on the webpage based on one or more of webpage settings, content interface settings, or other settings.

Process 300 includes detecting a trigger for a request to provide a debugging interface for a webpage (305). This may include, for example, a publisher triggering the request for the debugging interface. In some implementations, the publisher may trigger the request by appending a string to an end of a URL entered into a browser of the user device of the publisher. In other implementations, the publisher may trigger the request via another input, or the request may be triggered based on an input from the ISP or web hosting provider.

Process 300 further includes transmitting the request for the debugging interface to a remote device (310). In some implementations, the request is transmitted to a debugging system or other system configured to provide a script for causing the debugging interface to display on the webpage. The script may be generated by the debugging system or retrieved from a database or other source. Process 300 further includes receiving the script representing the debugging interface from the remote device (315).

In some implementations, 310 and 315 may include transmitting other information, such as website characteristics, content interface characteristics, etc., and receiving debugging information relating to the characteristics along with the script. In some such implementations, the script may be customized based on characteristics of the webpage, content interfaces, devices, etc. For instance, in some implementations, a reduced script specific to particular types of content interfaces, content types (e.g., anchor content items), devices, device characteristics, webpage characteristics, etc. may be provided in response to such information being transmitted along with the request. In some implementations, the debugging system may modify the script be removing portions of the script prior to transmitting the script to the publisher device. In some implementations, the debugging system may store multiple different types of scripts associated with different characteristics, and the debugging system may determine which script to provide based on the characteristics.

Process 300 further includes inserting the debugging interface into the webpage by injecting the script into data of the webpage during loading of the webpage by the browser application (320). The browser application receives the script from the debugging system and injects the script into the code of the webpage. In some implementations, the browser application injects the script into the code based on various tag information. If a tag was identified as being relevant to the debugging process when the debugging process was triggered, the browser application may determine an appropriate spot in the code to inject the script which will cause the debugging interface to display near the object associated with the tag. In other implementations, the debugging interface may be displayed within the webpage at any location where general debugging information can be displayed. For example, the debugging interface may be placed at the top of the webpage. The debugging interface may be displayed in several locations within the webpage (e.g., at each content interface on the webpage where a content item is eligible to appear). The browser application is configured to inject the script such that the debugging interface is part of the webpage, instead of being included in a separate webpage or being provided with a plug-in or other software component that provides the debugging interface in a separate window or component. In other words, the debugging interface is displayed as part of the webpage.

Process 300 further includes detecting a characteristic of at least one of the webpage, the content interface, or the device (325). The characteristic may prevent the content item from displaying (or displaying properly) on the webpage. In some implementations, the characteristic is a webpage characteristic, such as an orientation, width, length, etc., of one or more items to be displayed on the webpage, one or more settings related to video playback or audio playback on the webpage, etc. In some implementations, the characteristic is a content interface characteristic, such as the size of the content interface, the types of content items that may be displayed in the content interface, etc. In some implementations, the characteristic is a browser characteristic, such as the orientation of the browser, one or more plug-ins or other software component configured to add a feature to the browser, etc. In some implementations, the characteristic is a device characteristic, such as a device identifier, the type of device (e.g., mobile, tablet, desktop), the types of users accessing the webpage, etc.

In some implementations, a user selection is received and used to detect a characteristic. For example, a user selection relating to a position of a content interface on the webpage may be received. The position of the content interface may impact the presentation of the content item within the content interface. As another example, a user selection relating to a condition for causing one or more content items to be displayed on the webpage (e.g., a condition relating to which group of users or user devices should be presented with the content items) may be received.

Process 300 further includes generating debugging information relating to the content interface using the detected characteristic (330), and providing the debugging information in the debugging interface within the browser application (335). The characteristic information is used by comparing the characteristic to a set of rules governing display of the content items. The set of rules may be specific to the content item, specific to the content interface in which the content item is displayed, or is specific to the webpage. The comparison may be made using the script inserted into the code of the browser. The script may generally contain information relating to the set of rules governing display of the content items in the content interface. The debugging information is generated based on the comparison of the characteristic and the set of rules. The debugging information identifies one or more problems preventing the browser application from displaying at least one of the content items in the content interface. For example, the size of a content item or content interface may prevent the content item from properly displaying. In some implementations, a rule for a particular content item may indicate that the content item cannot be displayed within an interface less than 100 pixels wide by 100 pixels tall. The script and/or debugging system may compare a size of the content interface into which the publisher wishes to add the item (e.g., an interface 75 pixels wide by 125 pixels tall) to the rule and determine the interface is not wide enough to support that particular type of content item. In response, the script and/or debugging system may generate information to be provided through the debugging interface indicating the item may not be rendering because the interface is too small. As another example, the webpage may prevent video or audio playback of a video or audio component of the content item. The debugging information may include a text or image description of the problem, one or more available solutions to the problem, if there are one or more available content interfaces that the content item may properly display within, etc.

In the implementation of FIG. 3, the debugging information is determined at the user device, and more particularly by the script received at the user device. In other implementations, the characteristic is transmitted to a remote device, and the debugging information is received from the remote device.

Figure 4:
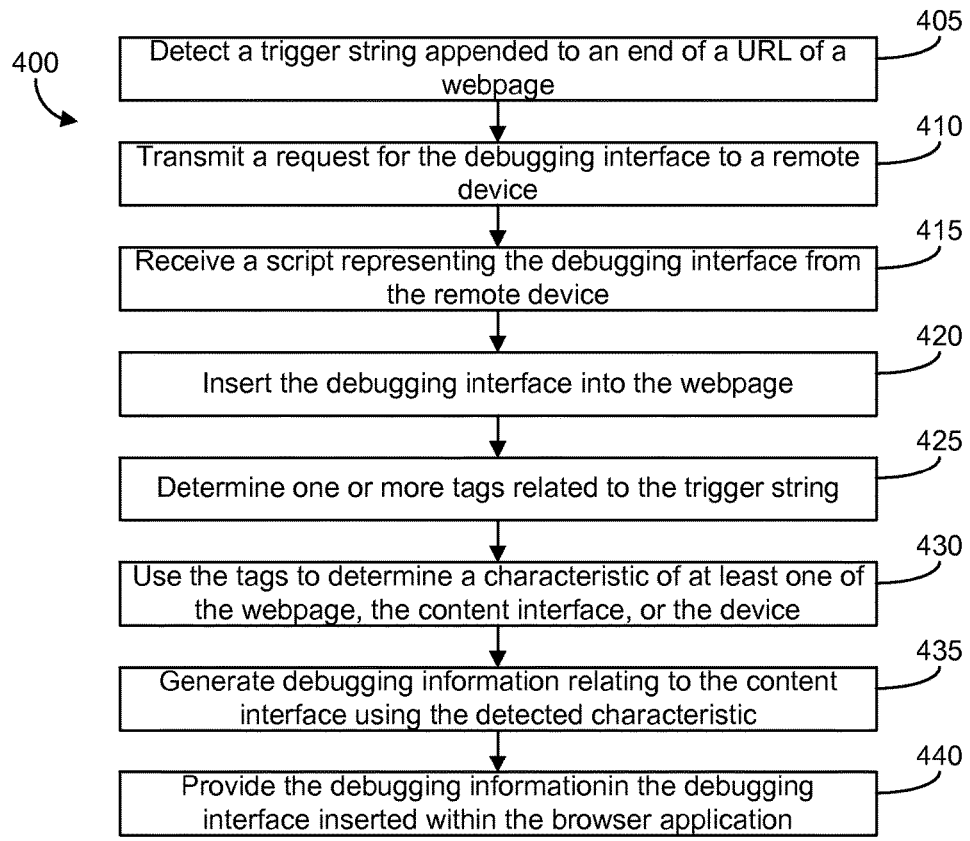
FIG. 4 is a flow diagram of a process for generating a debugging interface using a string appended to a URL according to an illustrative implementation.

Referring now to FIG. 4, a flow diagram of a process 400 for generating a debugging interface within a website using a string appended to a URL is shown according to an illustrative implementation. More particularly, process 400 relates to the generation of a debugging interface based on a publisher input and based on tags present in the webpage. Process 400 may be executed by, for example, user device 104 and debugging system 150 as described with reference to FIGS. 1-2.

Process 400 includes detecting a trigger string appended to an end of a URL of the webpage (405). The trigger string represents a request for a debugging interface on the webpage. In some implementations, the publisher enters the URL with the appended trigger string in the content interface, and the input is received at the user device. The trigger string may define a debugging mode or other information that may be used to determine how to present the debugging interface. For example, the trigger string may define one or more particular portions of the webpage or one or more particular content interfaces for which the debugging interface will address. As another example, the trigger string may be a general string or phrase used to initiate a general debugging process for the entire webpage and all content interfaces on the webpage. The trigger string is compared to the tag data to determine a correlation between the string and the tag data. For example, a tag for each content interface on the webpage may include identification information. In some implementations, if the trigger string relates to a general debugging mode the publisher wishes to activate, the trigger string may contain an identifier that matches the identifier of every content interface tag. In some implementations, if the trigger string relates to a specific type of content interface (e.g., anchor content interface), then the trigger string may include the phrase "anchor." The tag for the anchor content interface may include the phrase "anchor" as part of its identification, and the comparison of the string and tag result in the content interface being identified for debugging purposes. In some implementations, any tag data may be used in the comparison. For example, tag data may include an identifier, a name or title, metadata, data relating to the display of content in the content interface, or otherwise.

Process 400 further includes transmitting a request for the debugging interface to a remote device (410), receiving a script representing the debugging interface from the remote device (415), and inserting the debugging interface into the webpage (420). These operations are similar to the corresponding operations described in FIG. 3.

Process 400 further includes determining one or more tags related to the trigger string (425). The webpage may include a plurality of tags, each tag related to a particular webpage object (e.g., image, text, content interface, video, etc.). The tag may generally relate to a general description, identifying information for the item, and information relating to the presentation of the object in the webpage. Process 400 further includes using the tags to determine a characteristic (430). The characteristic may be a characteristic of the webpage, the content interface, or the device. As one example, the characteristic may be the size (in pixels) of a content interface of the webpage. As another example, the characteristic may be the type of user device (e.g., mobile, tablet, desktop). As yet another example, the characteristic may be one or more webpage settings or browser settings that allow or prevent certain types of media from being displayed on the webpage.

Process 400 further includes generating debugging information relating to the content interface using the detected characteristic (435), and providing the debugging information in the debugging interface (440). These operations are similar to the corresponding operations described in FIG. 3.

Figure 5:
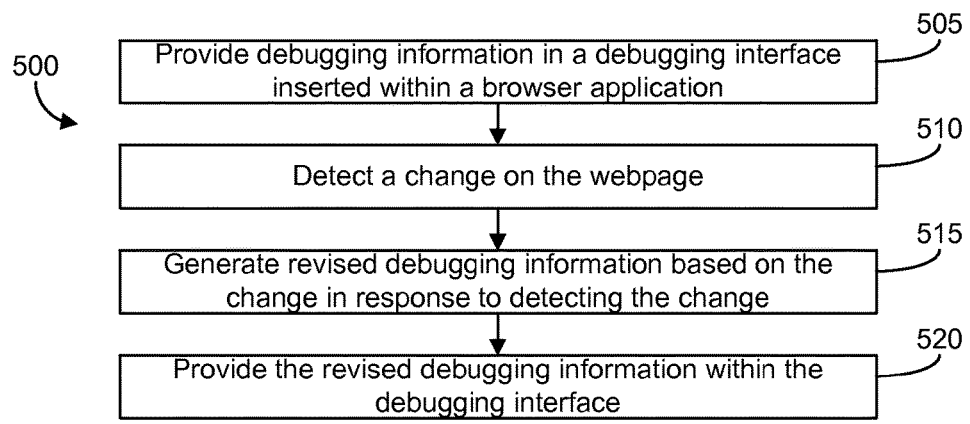
FIG. 5 is a flow diagram of a process of updating a debugging interface in response to a change on a webpage made by a publisher according to an illustrative implementation.

Referring now to FIG. 5, a flow diagram of a process 500 for updating a debugging interface in response to a change by a publisher of a webpage is shown according to an illustrative implementation. After presentation of a debugging interface (e.g., as generally described in FIGS. 3-4), the publisher or other user may make one or more changes relating to the presentation of a content item on the webpage. For example, the publisher may change a setting of one or more content interfaces, may change one or more webpage settings, or select a different content item or type of content item for display in a content interface. Once a change is made, the debugging information presented in the debugging interface may be obsolete. Process 500 may be executed by, for example, user device 104 and debugging system 150 to update the debugging information based on the changes.

Process 500 includes providing debugging information in a debugging interface inserted within a browser application (505). Process 500 further includes detecting a change on the webpage (510). As examples of changes, the publisher may change a setting to allow or disallow the playback of video or audio of a content item, may change the size of a content interface on the webpage, may add or remove a content interface, may change of the location of a content interface, or may any other type of change that may impact the presentation of content items on the webpage. In some implementations, the publisher provides a change via the user device, and the browser application of the user device detects the change. Data representative of the changes is generated and used to create new debugging information to display on the debugging interface. In some implementations, the data is captured by the script inserted into the code of the webpage (i.e., the script is configured to automatically detect changes and to generate new debugging information based on the changes). In some implementations, data representative of the changes are transmitted to debugging system 150. Debugging system 150 may then generate new debugging information, may generate a new script, or may otherwise transmit data back to user device 104 that can be used to provide updated debugging information.

Process 500 further includes generated revised debugging information based on the change in response to detecting the change (515). In some implementations, a characteristic of the webpage, content interface, or device that changed status is detected. For example, if a device setting was changed, the revised debugging information is based on the new settings. As another example, if one or more objects on the webpage were adjusted, the revised debugging information is based on the individual objects that were adjusted. In some implementations, one or more tags related to the adjusted objects are determined, and the tags are used to generate the revised debugging information. Process 500 further includes providing the revised debugging information within the debugging interface (520).

Figure 6A:
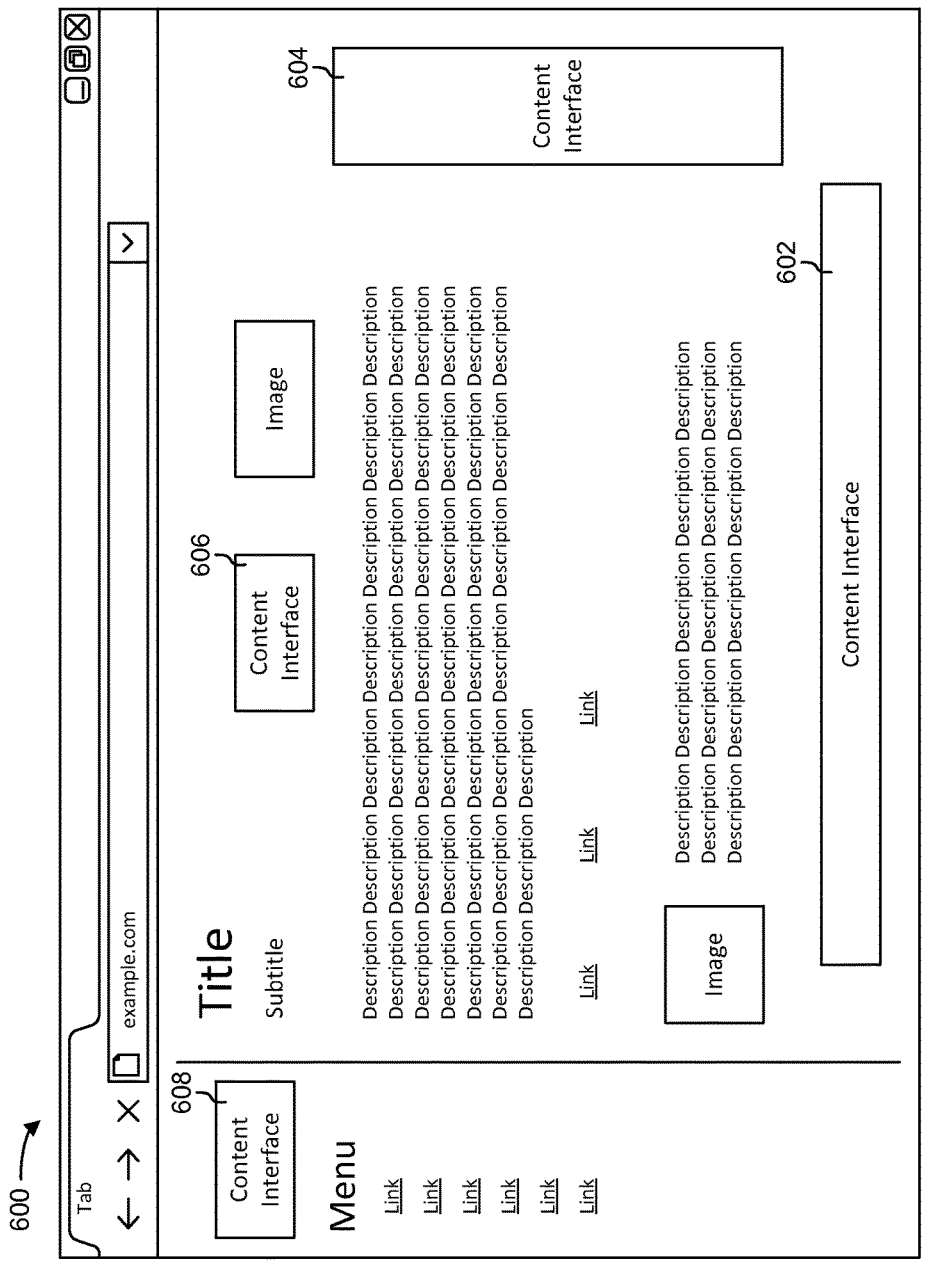
FIGS. 6A-C are illustrations of user interfaces configured to display a debugging interface according to an illustrative implementation.
Figure 6B:
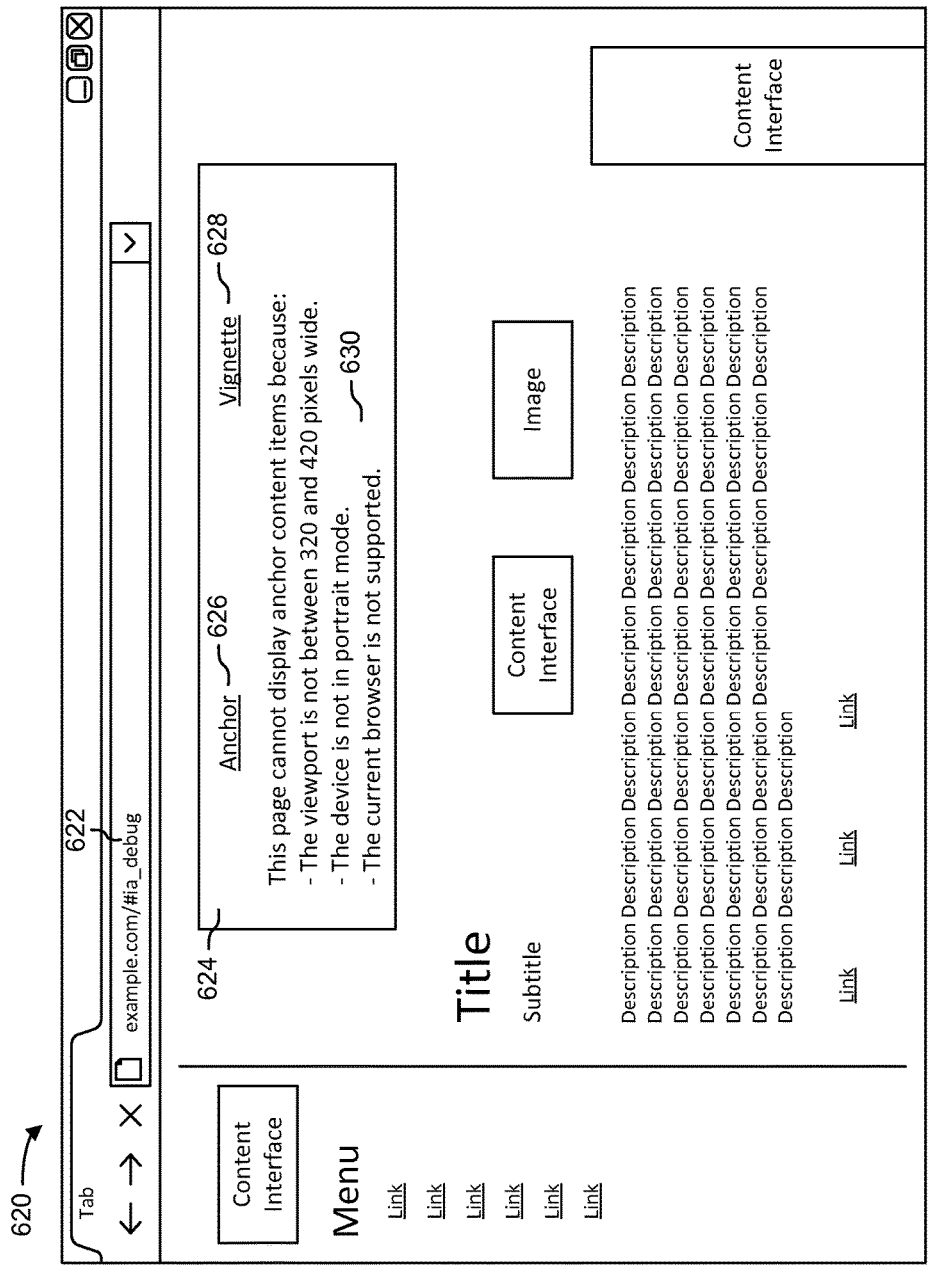
Figure 6C:
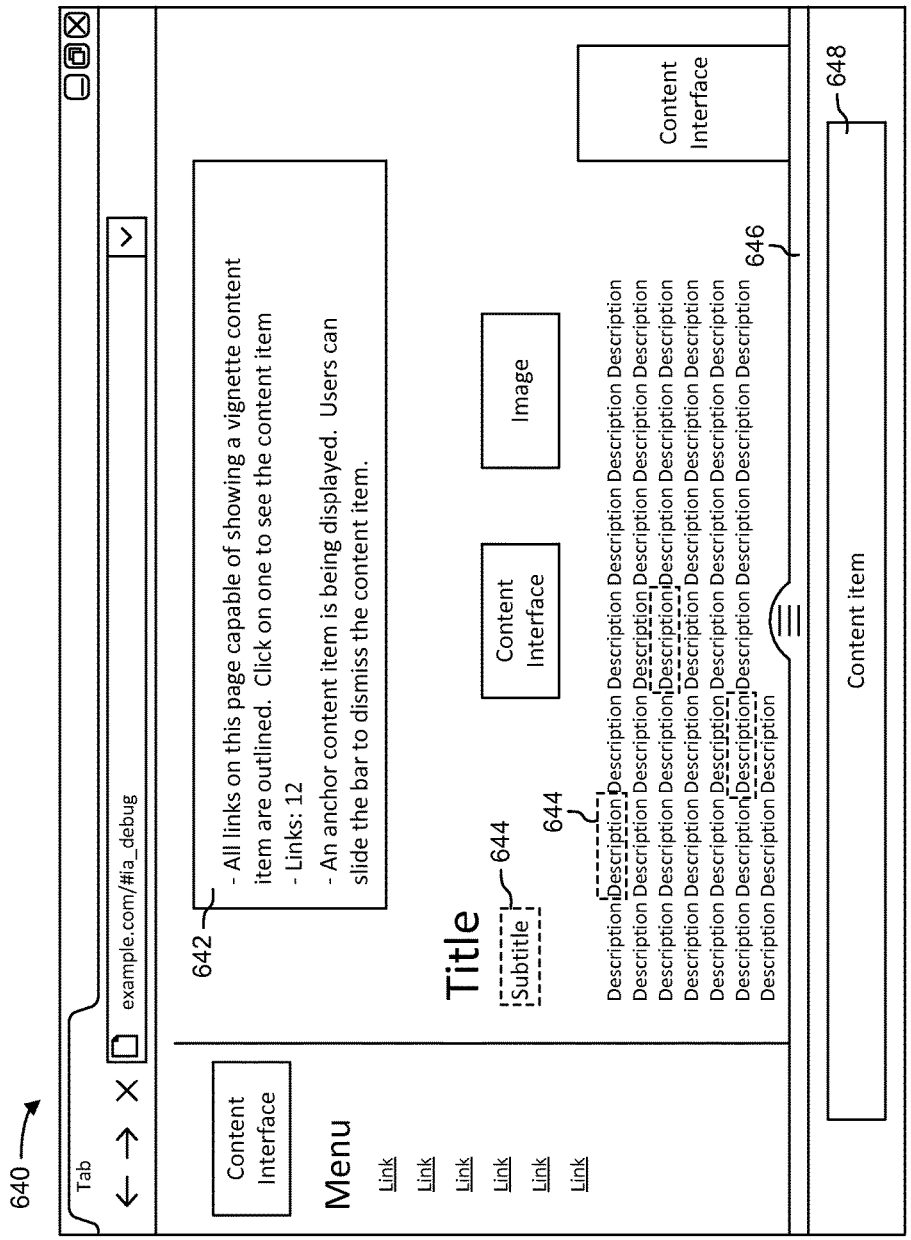

Referring now to FIGS. 6A-C, user interfaces configured to display a debugging interface are shown according to an illustrative implementation. Referring to user interface 600 of FIG. 6A, an example webpage is shown. The webpage generally includes a plurality of content interfaces or slots (e.g., content interfaces 602, 604, 606, 608). Some content interfaces may be configured to be placed in specific locations (e.g., content interface 602 may be designated as an "anchor" content interface, only to appear on the bottom of the webpage, content interface 604 may be only configured to display to the side of the objects on webpage 600, and so forth). The webpage further includes other objects (e.g., text, images, menus, links, etc.) typically found on webpages. A publisher may generally edit his or her webpage by adding, removing, or moving objects and content interfaces. For example, the publisher may select content items for display, may specify where content items to be displayed as a result of an auction are to be displayed, or otherwise. The webpage may be a webpage configured for display on one or more of a laptop, desktop, mobile device, tablet, or any other device with an Internet connection.

Referring now to FIG. 6B, the publisher may trigger a debugging interface by appending a string to the URL. In the implementation of FIG. 6B, assume user interface 620 is configured for display on a desktop or laptop device. As shown in user interface 620 of FIG. 6B, the publisher has appended the string "#ia_debug" 622 to the URL. String 622 may be identified by debugging system 150, and the debugging interface may be activated. String 622 may, in some implementations, specifically identify a single content interface (e.g., content interface 602), or may trigger a general debugging interface for all content interfaces.

In the implementation of FIG. 6B, string 622 identifies content interface 602 for debugging. The publisher has set content interface 602 to display two types of content items: "anchor" content items (content items for display on the top or bottom of a webpage) and "vignette" content items (content items relating to a particular object on the webpage). Content interface 602 may be configured to display anchor content items a percentage of the time (e.g., 5%, 10%, etc.), and other content items (e.g., vignette content items) at different percentages of time. In some implementations, the debugging interface described in the present disclosure may be used to provide a more convenient debugging process for content items that appear a percentage of a time. For example, instead of refreshing a webpage over and over until a particular content item appears (e.g., a content item configured to appear only 5% of the time), the debugging script may cause the content management server to provide the content item every time the debugging page is rendered, in order to view debugging information relating to the content item. The publisher may provide the selection of the content item to the debugging system, or may select the content item through the debugging interface, via an option displayed on the debugging interface.

Debugging interface 624 is shown displayed at the top of the webpage in response to the trigger for the debugging interface. In other implementations, debugging interface 624 may be displayed next to content interface 602 or in any other location. Debugging interface 624 relates to content interface 602 in particular. Since content interface 602 is configured to display two types of content items, the publisher may view debugging information for either type of content item. The publisher may click on links 626, 628 to view debugging information specific to different types of content items. In other implementations, debugging interface 624 may display all debugging information for all types of content items in the window, not displaying links 626, 628.

Description 630 may be provided within debugging interface 624 to provide publisher with information about the content interface. For example, description 630 indicates three errors with content interface 602 that prevents content items from being displayed properly in the interface. One potential error relates to the size of content interface 602. The size may be too small or too large, resulting in content items not being displayed because the items are not sized properly. Another potential error relates to the orientation of the user device or webpage. For example, user interface 620 is shown in landscape mode, while content interface 602 may be configured for display on portrait mode only. Another potential error relates to the current browser used to view the webpage. Content interface 602 may not be configured for display on some types of browsers.

Debugging interface 624 may be displayed in any way. For example, debugging interface 624 may be displayed in the format of a "debugging card", with all information shown at the top of the webpage within a block. As another example, debugging interface 624 may include a drop-down menu which, upon selection, may provide a list of errors or a list of options to the publisher. As yet another example, debugging interface 624 may be resized, collapsed, moved, dismissed (e.g., closed), expanded, or otherwise manipulated. Debugging interface 624 may be configured to display debugging information via text and/or images. The debugging information may be displayed in any language, and may be configured to provide any number of visual aids depending on information known about the publisher.

Referring now to FIG. 6C, another example user interface 640 with a debugging interface 642 is illustrated. In the implementation of FIG. 6C, the debugging information presented in debugging interface 642 is more general instead of directed towards an individual content interface or content item. For example, the debugging information indicates that there are a plurality of links or content interfaces capable of displaying a "vignette" content item. Various links 644 are shown outlined on the webpage to correspond with the debugging information. Upon selecting a link, the publisher may then view information specific to the object (e.g., word, image, menu option, link, etc.). For example, if the link is associated with a specific term, a content item specific to the term may be loaded. The publisher may then view debugging information specific to the content item.

Debugging interface 642 is shown to further indicate that an "anchor" content item is being displayed properly. A bar 646 is shown which separates the bottom of the webpage (where the anchor content item 648 is displayed) from the top portion of the webpage. The publisher may slide or otherwise operate bar 646 to expand or contract the content item. Since the content item is displayed properly, no errors are indicated in debugging interface 642.

In some implementations, the debugging interface of FIGS. 6B-C may include a "next" button, or other similar control that allows a publisher to scroll through multiple errors and content interfaces. In other words, the debugging interface may allow a publisher to view debugging information for several different content interfaces and content items, and the debugging information may be loaded all at once. It should be understood that the debugging interface may include any number of controls for allowing the publisher to view debugging information in various ways. For example, the debugging interface may include a help link or menu for assisting the publisher in using the debugging interface.

In some implementations, the debugging interface may be provided as part of a "pitch" or other feature that is provided to a user. For example, if a user is considering signing up for a service relating to the presentation of content items on a webpage, or has already signed up, the debugging interface may be automatically provided as a feature to assist the user in configuring his or her webpage for the display of content items. As another example, the debugging interface may direct the publisher to contact an account manager, sales representative, or other individual associated with the debugging system or the content items. Such individuals may be able to assist the publisher use the debugging system optimally.

In some implementations, the debugging interface may provide aggregated information to the publisher relating to the presentation of content items. For example, the debugging interface may provide statistics about how many content items are displayed in the one or more content interfaces on the webpage, how many are rendering correctly, how many are experiencing errors, how many of the errors are associated with particular types of content items, etc. The statistics may provide information to the publisher that allows the publisher to optimize the placement of content items in the content interfaces. For example, the publisher may decide to place one type of content item at the top of each webpage and a second type of content item only occasionally on an anchor content interface based on the information.

Figure 7:
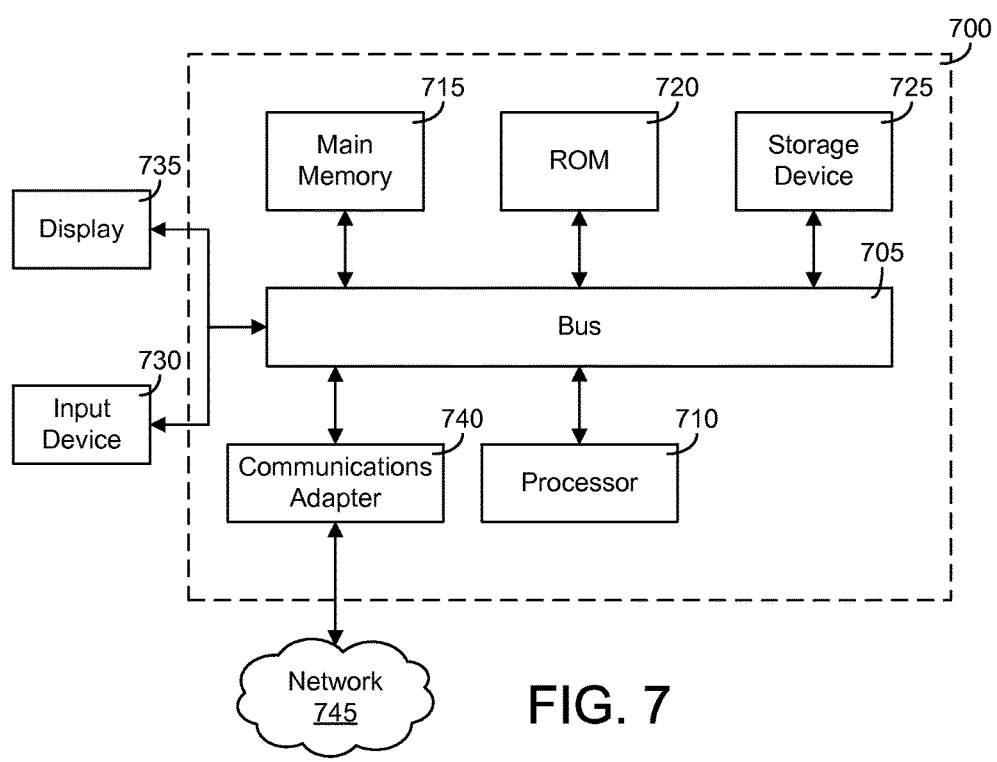
FIG. 7 is a block diagram of a computing system according to an illustrative implementation.

FIG. 7 illustrates a depiction of a computer system 700 that can be used, for example, to implement an illustrative user device 104, an illustrative content management system 108, an illustrative content provider device 106, an illustrative debugging system 150, and/or various other illustrative systems described in the present disclosure. Computing system 700 includes a bus 705 or other communication component for communicating information and a processor 710 coupled to bus 705 for processing information. Computing system 700 also includes main memory 715, such as a random access memory (RAM) or other dynamic storage device, coupled to bus 705 for storing information, and instructions to be executed by processor 710. Main memory 715 can also be used for storing position information, temporary variables, or other intermediate information during execution of instructions by processor 710. Computing system 700 may further include a read only memory (ROM) 720 or other static storage device coupled to bus 705 for storing static information and instructions for processor 710. A storage device 725, such as a solid state device, magnetic disk or optical disk, is coupled to bus 705 for persistently storing information and instructions.

Computing system 700 may be coupled via bus 705 to a display 735, such as a liquid crystal display, or active matrix display, for displaying information to a user. An input device 730, such as a keyboard including alphanumeric and other keys, may be coupled to bus 705 for communicating information, and command selections to processor 710. In another implementation, input device 730 has a touch screen display 735. Input device 730 can include a cursor control, such as a mouse, a trackball, or cursor direction keys, for communicating direction information and command selections to processor 710 and for controlling cursor movement on display 735.

In some implementations, computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 700 in response to processor 710 executing an arrangement of instructions contained in main memory 715. Such instructions can be read into main memory 715 from another computer-readable medium, such as storage device 725. Execution of the arrangement of instructions contained in main memory 715 causes computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

The debugging interface as described in the present disclosure may be implementable for any type of third-party content item (i.e., for any type of content item to be displayed on a webpage). In one implementation, the content items may include advertisements. In one implementation, the content items may include any text, images, video, stories (e.g., news stories), social media content, links, or any other type of content provided by a third-party for display on the webpage of a first-party content provider. The type of content item for which the debugging interface may be generated is not limiting.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

detecting, by a device comprising one or more processors, a trigger for a request to provide a debugging interface for a webpage, wherein the webpage configured to display a plurality of content items;

in response to detecting the trigger, transmitting, by the one or more processors, the request for the debugging interface to a remote device;

receiving, by the one or more processors, from the remote device, a script to provide the debugging interface for the webpage;

inserting, by the one or more processors, the debugging interface into the webpage by injecting the script received from the remote device into code of the webpage during loading of the webpage by a browser application, wherein the debugging interface provided within the webpage displayed by the browser application;

detecting, by the one or more processors, a characteristic indicative of at least one of a type of the browser application, a type of the device, or an orientation of the device;

determining, by the one or more processors, whether the detected characteristic satisfies a set of rules governing display of the content items within the webpage;

generating, by the one or more processors, debugging information relating to at least one of the content items based on the determination of whether the detected characteristic satisfies the set of rules governing display of the content items within the webpage, wherein the debugging information comprising information relating to a problem associated with the browser application displaying the at least one of the content items in the webpage, wherein the script configured to perform one or more functions relating to the display of the debugging information; and providing, by the one or more processors, the debugging information in the debugging interface inserted within the browser application.

2. The method of claim 1, wherein detecting the trigger comprises detecting a selection of an item on a second webpage generated by a web hosting provider hosting the webpage.

3. The method of claim 1, wherein detecting the trigger comprises receiving the trigger from an Internet service provider associated with the Internet connection used to access the webpage.

4. The method of claim 1, wherein detecting the trigger comprises detecting a trigger string appended to an end of a uniform resource locator (URL) of the webpage.

5. The method of claim 4, wherein the webpage includes a plurality of tags, and wherein detecting the characteristic comprises:
   determining one or more tags related to the trigger string; and
   using the tags to determine the characteristic;
   wherein the tags relate to one or more properties affecting the display of the content items on the webpage; and
   wherein the debugging information is generated using the tags.

6. The method of claim 1, wherein the characteristic further comprises one or more links present on the webpage.

7. The method of claim 1, further comprising:
   detecting a change on the webpage after providing the debugging information;
   generating revised debugging information based on the change in response to detecting the change; and
   providing the revised debugging information within the debugging interface.

8. The method of claim 1, further comprising receiving a user selection relating to at least one of:
   a position of the content interface on the webpage; or
   a condition for causing one or more of the content items to be displayed on the webpage.

9. The method of claim 1, wherein generating the debugging information comprises at least one of:
   generating the debugging information using the one or more processors; or
   transmitting, using the one or more processors, the characteristic to the device and receiving the debugging information from the device in response to transmitting the characteristic.

10. A system, comprising:
   at least one computing device operably coupled to at least one memory and configured to:
      detect a trigger for a request to provide a debugging interface for a webpage, wherein the webpage configured to display a plurality of content items;
      in response to detecting the trigger, transmit the request for the debugging interface to a remote device;
      receive, from the remote device, a script to provide the debugging interface for the webpage;
      insert the debugging interface into the webpage by injecting the script received from the remote device into code of the webpage during loading of the webpage by a browser application, wherein the debugging interface provided within the webpage displayed by the browser application;
      detect a characteristic indicative of at least one of a type of the browser application, a type of the at least one computing device, or an orientation of the at least one computing device;
      determine whether the detected characteristic satisfies a set of rules governing display of the content items within the webpage;
      generate debugging information relating to at least one of the content items based on the determination of whether the detected characteristic satisfies the set of rules governing display of the content items within the webpage, wherein the debugging information comprising information relating to a problem associated with the browser application displaying at least one of the content items in the webpage, wherein the script configured to perform one or more functions relating to the display of the debugging information; and
      provide the debugging information in the debugging interface inserted within the browser application.

11. The system of claim 10, wherein detecting the trigger comprises detecting a selection of an item on a second webpage generated by a web hosting provider hosting the webpage.

12. The system of claim 10, wherein detecting the trigger comprises receiving the trigger from an Internet service provider associated with the Internet connection used to access the webpage.

13. The system of claim 10, wherein detecting the trigger comprises detecting a trigger string appended to an end of a uniform resource locator (URL) of the webpage.

14. The system of claim 13, wherein the webpage includes a plurality of tags, and wherein detecting the characteristic comprises:
   determining one or more tags related to the trigger string; and
   using the tags to determine the characteristic;
   wherein the tags relate to one or more properties affecting the display of the content items on the webpage; and
   wherein the debugging information is generated using the tags.

15. The system of claim 10, wherein the at least one computing device is further configured to:
   detect a change on the webpage after providing the debugging information;
   generate revised debugging information based on the change in response to detecting the change; and
   provide the revised debugging information within the debugging interface.

16. The system of claim 10, wherein the at least one computing device is further configured to receive a user selection relating to at least one of:
   a position of the content interface on the webpage; or
   a condition for causing one or more of the content items to be displayed on the webpage.

17. One or more non-transitory computer-readable storage media having instructions stored thereon that, when executed by one or more processors of device, cause the one or more processors of the device to execute operations comprising:
   detecting a trigger for a request to provide a debugging interface for a webpage, wherein the webpage configured to display a plurality of content items;
   in response to detecting the trigger, transmitting the request for the debugging interface to a remote device;
   receiving, from the remote device, a script to provide the debugging interface from for the webpage;
   inserting the debugging interface into the webpage by injecting the script received from the remote device into code of the webpage during loading of the webpage by a browser application, wherein the debugging interface provided within the webpage displayed by the browser application;

detecting a characteristic indicative of at least one of a type of the browser application, a type of the device, or an orientation of the device;

determining whether the detected characteristic satisfies a set of rules governing display of the content items within the webpage;

generating debugging information relating to at least one of the content items based on the determination of whether the detected characteristic satisfies the set of rules governing display of the content items within the webpage, wherein the debugging information comprising information relating to a problem associated with the browser application displaying at least one of the content items in the webpage, wherein the script configured to perform one or more functions relating to the display of the debugging information; and providing the debugging information in the debugging interface inserted within the browser application.

18. The computer-readable storage media of claim 17, wherein detecting the trigger comprises one of:

detecting a selection of an item on a second webpage generated by a web hosting provider hosting the webpage; and receiving the trigger from an Internet service provider associated with the Internet connection used to access the webpage.

19. The computer-readable storage media of claim 17, wherein detecting the trigger comprises detecting a trigger string appended to an end of a uniform resource locator (URL) of the webpage.

20. The computer-readable storage media of claim 19, wherein the webpage includes a plurality of tags, and wherein detecting the characteristic comprises:

determining one or more tags related to the trigger string; and using the tags to determine the characteristic;

wherein the tags relate to one or more properties affecting the display of the content items on the webpage; and wherein the debugging information is generated using the tags.

* * * * *